United States Patent [19]
Mallery et al.

[11] 3,841,154
[45] Oct. 15, 1974

[54] BALLOON BORNE DIFFERENTIAL TEMPERATURE SENSOR AND TRANSMISSION SYSTEM

[75] Inventors: Lawrence E. Mallery, San Jose; Theodore Arken, Sunnyvale; Henning C. Swenson, Jr., Los Gatos, all of Calif.

[73] Assignee: GTE Sylvania Incorporated, Mountain View, Calif.

[22] Filed: Dec. 26, 1972

[21] Appl. No.: 318,090

[52] U.S. Cl. ............... 73/170 R, 73/342, 340/201 R
[51] Int. Cl. ............................................. G01w 1/08
[58] Field of Search ....... 73/342, 170 R; 340/201 R; 325/113

[56] References Cited
UNITED STATES PATENTS

| | | | |
|---|---|---|---|
| 2,347,345 | 4/1944 | Wallace | 73/170 R |
| 2,613,347 | 10/1952 | Todd | 325/113 |
| 3,295,353 | 1/1967 | Hagen | 73/342 |

OTHER PUBLICATIONS

"Measurements of Atmospheric Turbulence Relevant to Optical Propagation", by Lawrence et al., June 1970, in Journal of the Optical Society of America, Vol. 60, No. 6, pages 826–830.

*Primary Examiner*—James J. Gill
*Assistant Examiner*—Denis E. Corr
*Attorney, Agent, or Firm*—John F. Lawler; Norman J. O'Malley; Elmer J. Nealon

[57] ABSTRACT

Differential temperature sensing and transmission apparatus is carried by a gas-filled meteorological balloon from ground level through the tropopause for continuously measuring differential temperature and transmitting same back to the ground. The temperature difference between two probe sensors is converted to a root means square (RMS) electrical voltage by means of processing circuits and is applied to the modulator of a modified radiosonde transmitter for transmission from aloft to a ground-based receiver. Differential temperature (AT) sensing probe consist of two platinum wires connected as two resistance arms in a null balanced wheatstone bridge, the output of which is demodulated, amplified, root mean squared and applied to the modulated radiosonde transmitter to vary the pulse repetition frequency (PRF) linearly with the value of $(\overline{\Delta T^2})^{1/2}$. Dynamic range of the RMS temperature difference is increased by a two-step variable gain control, a feedback system being employed to automatically select one of the two gain ranges over 0.004°C. to 0.676°C.; a signal indicating the gain scale in use is applied as one of the inputs to the modified radiosonde transmitter for proper correlation of the data at the ground-based receiver. The linear change of transmitter PRF with the $\Delta T$ signal input is produced by charging a capacitor with a current that varies linearly with the change in the $\Delta T$ signal.

4 Claims, 5 Drawing Figures

BALLOON BORNE DIFFERENTIAL TEMPERATURE SENSOR AND TRANSMISSION SYSTEM

BACKGROUND OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

This invention relates to temperature sensor and transmission systems and more particularly to a differential temperature sensor and transmission system for use with balloon borne apparatus for measuring the vertical profile of atmospheric turbulence through the determination of temperature fluctuations.

The measurement of turbulence in the regions of the atmosphere up through the tropopause is an important factor in predicting the refraction and diffraction of laser beams propagating through the atmosphere, in estimating the speed with which pollutants diffuse and in detecting thermal inversions. The parameter directly related to the strength of such turbulence is the temperature differential between adjacent points in space and therefore accurate progressive measurement of such temperature differential through the atmosphere and the tropopause is a prerequisite to an accurate determination of the turbulence profile in this region. There is no known apparatus capable of making such differential temperature measurements up through the tropopause. Heretofore differential temperature sensings have been made at or near ground level with stationary equipment and the results of the measurements have been extrapolated to predict turbulence conditions at higher elevations. Typical of such experiments are those reported by J. R. Kerr in an article entitled *Experiments on Turbulence Characteristics and Multiwavelength Scintillation Phenomena*, Journal of the Optical Society of America, Volume 62, Number 9, September 1972, pages 1040-1049. Other researchers have reported microthermal evidence of turbulence up to several kilometers (3 to 5) above the surface, see *Measurement of Atmospheric Turbulence Relevant to Optical Propagation* by R. S. Lawrence et al., Journal of the Optical Society of America, Volume 60, page 826 et seq., June 1970. In these prior efforts, however, no actual temperature sensings to altitudes of 12 to 14 km were available in the absence of apparatus capable of reliably measuring and recording these data continuously over this region of interest.

A general object of this invention is the provision of a temperature measuring and transmitting system capable of detecting microthermal changes in the atmosphere from ground level up through the tropopause and for accurately transmitting the temperature data to ground-based receiving station.

These and other objects of the invention are achieved with a temperature sensor, processing circuits and a modulated radio frequency transmitter mounted under a gas-filled meteorological balloon and continuously measuring and transmitting differential temperature sensings between the ground and the tropopause. The differential temperature sensings are converted to electrical signals which change the PRF of a radio frequency oscillator linearly with change in magnitude of the temperature sensing. Receiving equipment on the ground accurately reconverts the transmitted radio frequency signals to differential temperature data for use in computing turbulence characteristic parameters including the temperature structure coefficient $[C_T^2(h)]$ and the refractive-index structure coefficient $[C_N^2(h)]$.

DESCRIPTION OF PREFERRED EMBODIMENT

Figure 1:
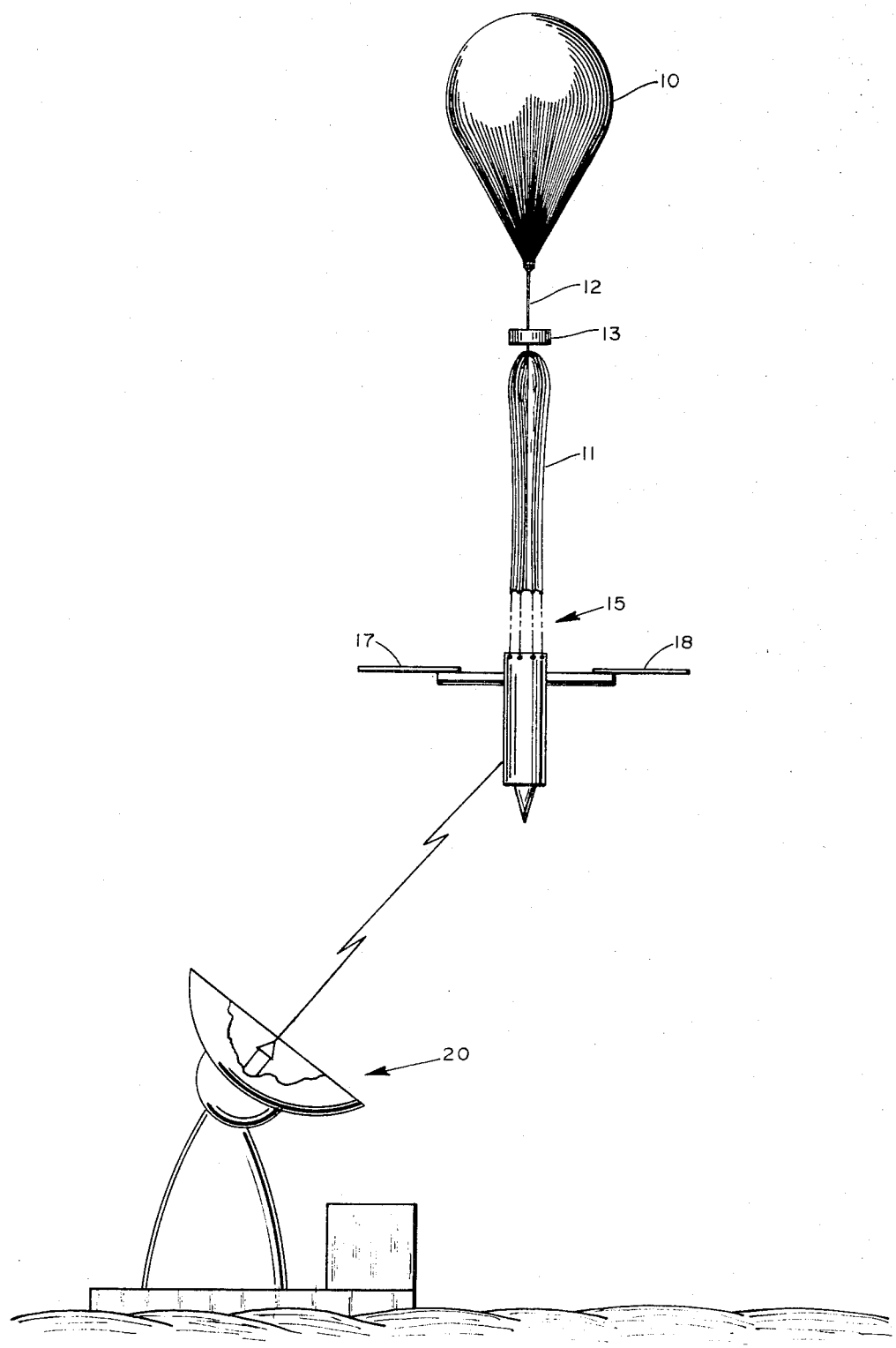
FIG. 1 is a schematic view of balloon borne temperature sensing apparatus embodying the invention together with ground-based receiving station.

Referring now to the drawings, FIG. 1 illustrates a system embodying the invention including a gas-filled meteorological balloon 10 to which parachute 11 is attached by line 12 which extends through a detachment mechanism 13. Supported below the parachute 11 is apparatus 15 which contains the temperature sensing and transmitting equipment described in detail below as well as power supplies such as batteries or the like. Part of the apparatus 15 includes temperature sensing probes 17 and 18 whose resistance varies with temperature consisting of fine platinum wires spaced about 1 meter apart on the package and electrically connected as resistance arms in a wheatsone bridge for continuously sensing the temperature difference between the probes caused by turbulence as the apparatus ascends and descends through the atmosphere. The temperature sensings are transmitted as radio frequency waves to appropriate receiving equipment 20 located on the ground and adapted to convert these readings to permanently recorded data for further computations of turbulence characteristic parameters. Measurements are made on descent as well as during the ascent flight by detachment of the balloon at the selected altitide through predetermined delayed action of mechanism 13 and subsequent deployment of parachute 11.

Figure 2A:
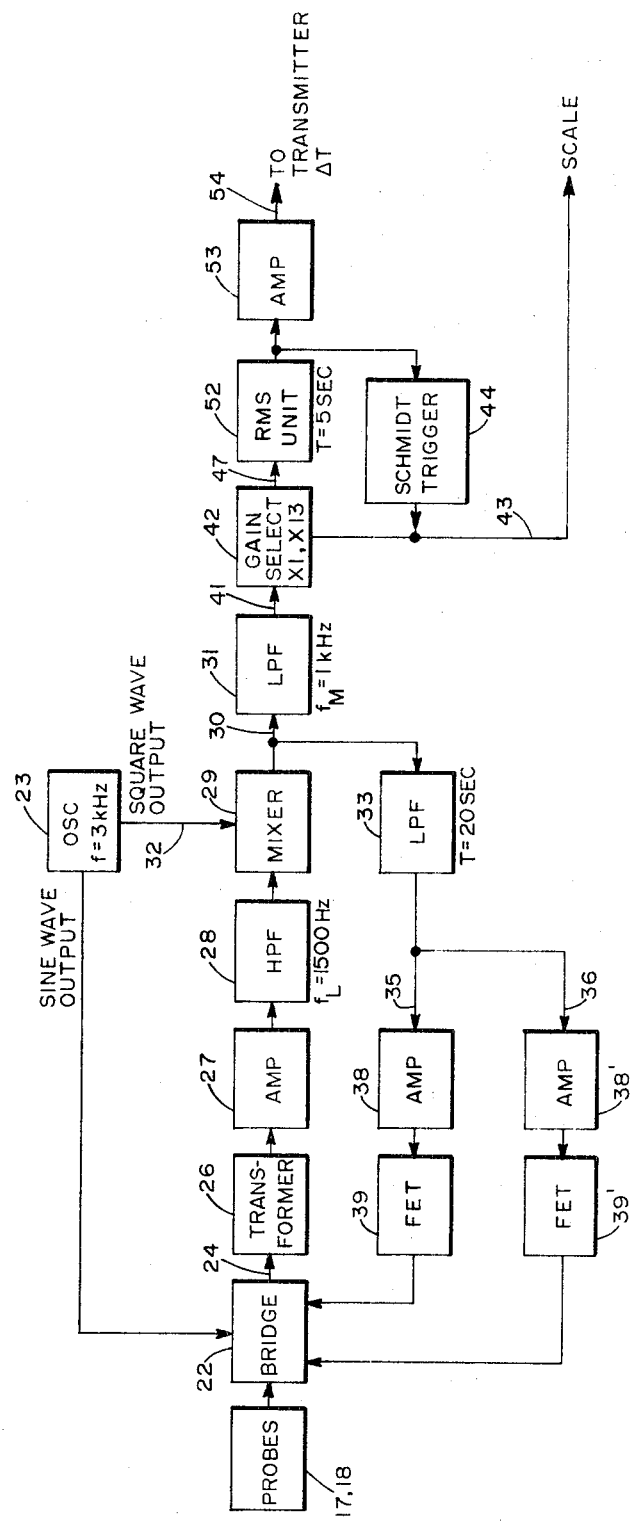
FIG. 2A is a block diagram of the electrical circuits which process the signals from temperature sensing probes and convert them into signals for modulating a radio frequency transmitter.

Referring now to FIG. 2, the circuit for deriving the temperature difference ΔT between the sensor probes 17 and 18 is shown and comprises a wheatstone bridge 22 having probes 17 and 18 as two of the four resistance arms. Bridge 22 is energized by oscillator 23 and produces an output at 24 that is amplitude modulated by the temperature difference between the probes. The output 24 of the bridge passes through transformer 26, amplifier 27 and high pass filter 28 to mixer 29 which functions as a synchronous detector to produce a demodulated signal as an output on line 30 to low pass filter 31. Mixer 29 receives a square wave input on line 32 as derived from oscillator 23 for synchronously detecting the differential temperature signal generated by the bridge 22.

Figure 3:
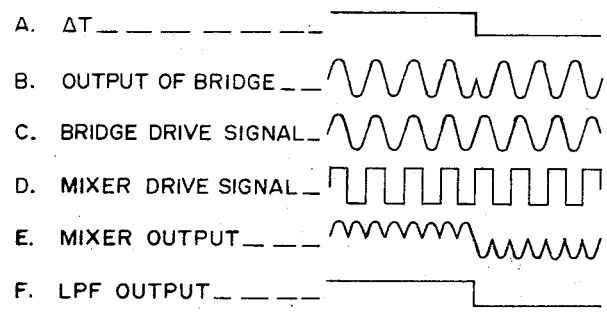
FIG. 3 is a set of waveforms illustrating the operation of the mixer circuit in FIG. 2A.

The operation of the mixer will be better understood by reference to FIG. 3 which shows the waveforms at various points in the circuit described above. For clairity, the waveforms assume ΔT (the temperature difference between the two probes) varies in a square wave manner as shown at FIG. 3A. (This is not a necessary condition as far as the system is concerned. It measures the RMS variation of whatever the input does.) As ΔT varies, the bridge first unbalances in one direction and then the other. This change in unbalance causes a phase reversal at the bridge output as shown in FIG. 3B and also at the mixer output, see FIG. 3E. The mixer output is filtered by the low pass filter and the waveform ΔT is recovered, see FIG. 3F. Variation in the amplitude of ΔT is reflected in a proportionally larger amplitude of excursion of the waveform in FIG. 3A which is manifested in a similar change in amplitude in waveforms of FIGS. 3B, 3E and 3F.

In order to maintain electrical balance of the bridge so as to produce no output signal in the absence of a temperature difference between the probes, a feedback loop is provided and comprises a low pass filter 33 having a time constant of approximately 20 seconds and having an output connected to lines 35 and 36 for connection to the fixed resistances, respectively, in the remaining two arms of bridge 22. Lines 35 and 36 are connected in series with amplifiers 38, 38' and field effect transistors 39, 39', the latter varying the resistances in shunt with the probe sensors to provide balancing of the bridge.

The output of filter 31 on line 41 passes to a gain select circuit 42 which in conjunction with an RMS unit 52 and a Schmidt trigger 44 automatically varies the amplification of the input signal between unity and 13, for example, depending on signal strength and which provides a signal on line 43 indicating which scale of amplification is applicable.

Figure 4:
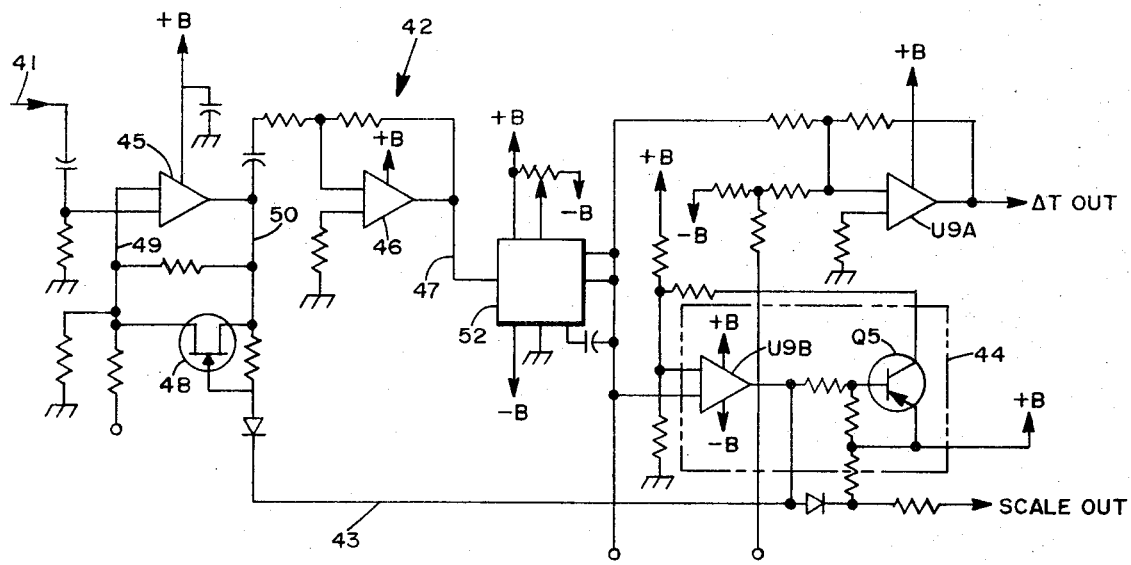
FIG. 4 is a schematic circuit diagram of the automatic gain select circuit in FIG. 2A.

A schematic diagram of the automatic gain select circuit 42 is shown in FIG. 4 and comprises series connected amplifiers 45 and 46 which receive the input signal on line 41 and produce the amplified output signal on line 47. The gain of amplifier 45 is determined by the state of conduction of transistor 48 which is connected across input line 49 and output line 50 of the amplifier as shown. Transistor 48 operates as a switch that is either opened or closed. When the switch is open, the gain is 13. When the switch is closed, the gain is unity. The status of the switch depends upon the amplitude of the voltage at the output of the RMS unit 52 relative to the upper and lower thresholds of a Schmidt trigger device 44. If the gain should be set at 13 (switch open) and if a large signal is present, the upper threshold of the Schmidt trigger 44 is exceeded. This changes the state of the device 44, closes switch 48 and sets the gain of amplifier 45 to unity. If the signal should drop in level to where it is below the lower threshold of the Schmidt trigger, the state of the latter changes back and opens switch 48 to again set the gain of amplifier 45 to 13. To prevent oscillation, an overlap exists between the two gain ranges. The automatic change in the amplification scale of this circuit is indicated by a change of signal on scale line 43 for ultimate transmission to the ground-based receiver.

The output 47 of the gain select circuit 42 is applied to a root mean square unit (RMS) 52 which operates on the input signal to produce an output that is the square root of the squared value of the temperature difference as measured over an averaging period of approximately 5 seconds. Unit 52 is a commercially available component of well known construction so that further details on its structure and operation are unnecessary. The output of unit 52 is amplified by amplifier 53 and is connected by line 54 together with scale information on line 43 to a transmitter described below.

Figure 2B:
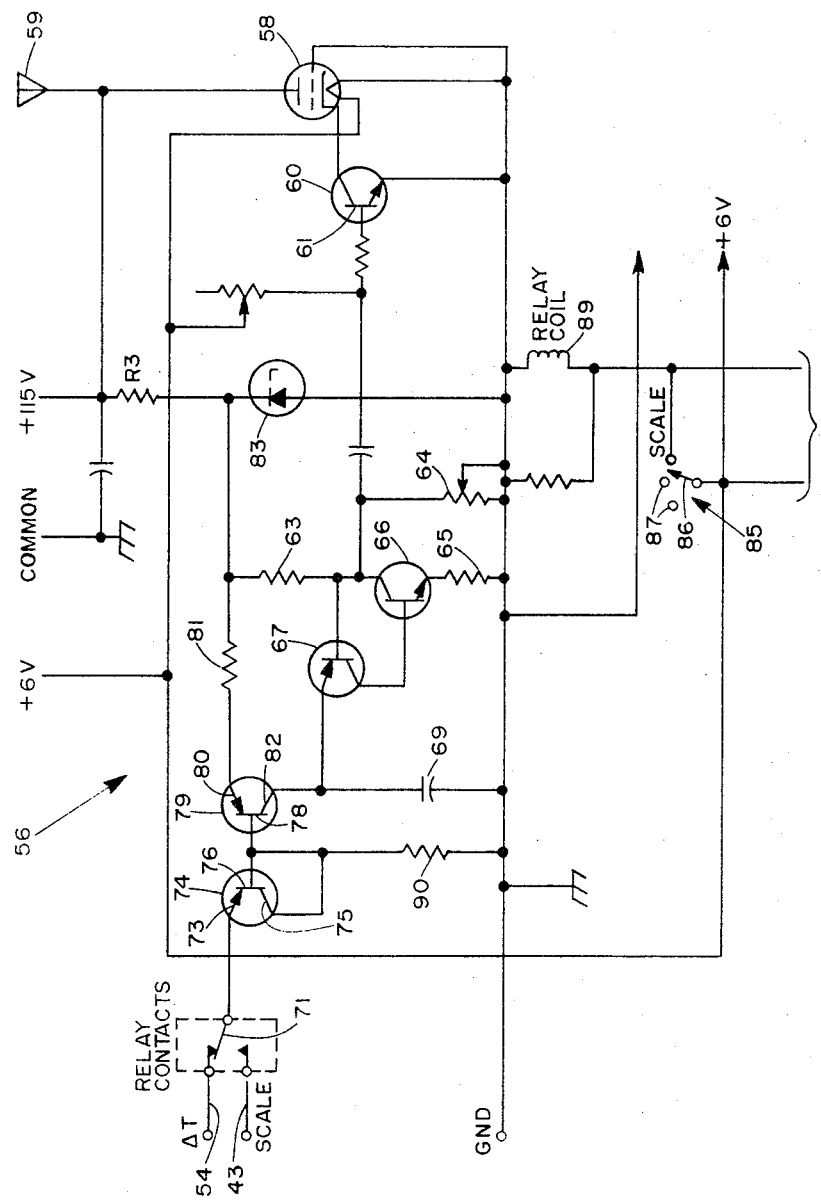
FIG. 2B is a schematic circuit diagram of radiosonde equipment modified in accordance with the invention.

In accordance with this invention, the differential temperature signal on line 54 and the scale information signal on line 43 are applied to a radio frequency transmitting unit 56 shown schematically in FIG. 2B and comprises a modified radiosonde transmitter of the type utilized by weather and meteorological stations for obtaining meteorological data in the earth's atmosphere.

The portion of unit 56 which is the same as the conventional radiosonde circuit comprises an oscillator 58 connected to a transmitting antenna 59 which propagates radio frequency waves to the ground based equipment 20. Oscillator 58 is operated by a transistor modulator 60 which turns the oscillator on and off at a repetition frequency dependent upon the repetition rate of pulses applied to its base 61. The input to modulator 60 comprises a series of pulses generated by a regenerative threshold circuit consisting of resistors 63, 64 and 65 and transistors 66 and 67. The threshold point of the circuit is set by resistors 63 and 64, the pulse repetition frequency being determined by the charging of a capacitor 69 through resistors, not shown, which include the resistance of the radiosonde absolute temperature and humidity elements. Since the foregoing circuits of the transmitting unit 56 are substantially identical to the standard radiosonde circuit, they do not as such constitute this invention.

In accordance with this invention, the differential temperature signals on line 54 and the scale information on line 43 are applied selectively through movable relay contact 71 to the emitter 73 of transistor 74, the collector 75 of which is connected to the base 76 so that the transistor functions as a diode. The output of this diode is applied to the base 78 of transistor 79 whose emitter 80 is connected through resistor 81 to a source of regulated voltage and whose collector 82 is connected to one side of charging capacitor 69 and to the emitter of transistor 67. The source of regulated voltage for transistor 79 is a temperature compensated regulator diode 83 connected between ground and the power supply as shown.

With the threshold reference voltage for conduction of transistor 67 set by the values of voltage divider resistors 63 and 64, the repetition rate at which transistor 67 is biased to the conducting state is determined by the rate of change of voltage across capacitor 69 as it charges. The rate at which capacitor 69 is charged is controlled directly by the bias voltage applied from relay contact 71 through diode 74 to the base of transistor 79. As a consequence, the charging of capacitor 69 is linearly related to the value of the voltage representing the differential temperature on line 54. Accordingly, the pulse repetition frequency of oscillator 58 is a linear function of the value of the temperature difference detected by sensor probes 17 and 18 which greatly simplifies the processing of the transmitted signals at the ground-based receiver.

Relay contact arm 71 is operated to switch between the differential temperature signal on line 54 and the scale reading on line 43 by a barometric switch 85 having a moving contact 86 which moves across stationary commutator contacts, a few being shown at 87, during ascent of the balloon borne apparatus. Periodically during the traverse of the moving contact 86 across the commutator contacts 87, the power supply circuit is closed through relay coil 89 causing the moving arm 71 of relay contacts to sample scale voltage on line 43, this information being ultimately transmitted to the ground-based receiving apparatus through antenna 59.

By way of example, variable resistor 64 may be used to set a predetermined threshold voltage for conduction of transistor 67 so that an input voltage of approximately 5 volts on the ΔT line 54 will result in a PRF of 200 Hz of oscillator 58. Transistor 79 and resistor 81 essentially constitute a current source for linearly charging capacitor 69 to the triggering threshold of about 4.2 volts for the emitter of transistor 67. Diode 74 provides temperature compensation for the emitter base junction of transistor 79. Resistor 90 is a load resistor for the input voltage and also provides the path for the base current of transistor 79. When a voltage between approximately 4.5 to 12.5 is applied to the emitter of diode 74, this voltage appears at the emitter of transistor 79 due to the emitter-base and base-emitter voltage compensation of transistor 79 and diode 74. The current flowing in capacitor 69 from the collector of transistor 79 is represented by the following expression:

$$I_C \approx 12.8 - V_B/R_{81}$$

where $I_C$ is the charging current, $V_B$ is the voltage at the base of transistor 79 and $R_{81}$ is the resistance of resistor 81.

Depending upon the input voltage, the capacitor charging current in one embodiment of the invention varied from approximately 3.5 to 100 microamperes, resulting in a pulse repetition frequency range of about 8 to 100 Hz. In actual temperature tests of the transmitter circuit, pulse repetition frequency changes of no greater than 1 percent from +25° C. to −50° C. were recorded. During this test the pulse repetition frequency was linear compared with the input voltage to the circuit.

What is claimed is:

1. A system for continuously measuring differential temperature from the ground level to the tropopause comprising a gas-filled meteorological balloon and
   measuring and transmitting apparatus supported by said balloon during an ascending flight comprising two substantially identical probes having resistances which vary with temperature,
   means for detecting relative changes in resistance of said probes and producing an electrical signal having a value corresponding to the difference in temperature at said probes,
   a radio frequency transmitter comprising
   an oscillator,
   modulator means for turning said oscillator on and off to produce pulses having a repetition frequency, and
   means for applying a signal proportional to said differential temperature signal to said modulator means for varying the pulse repetition frequency of said oscillator at a rate corresponding to the value of said differential temperature signal, and
   receiver means on the ground adapted to receive said pulses.

2. The system according to claim 1 with means for amplifying said signal at low and high gain scales, means responsive to the magnitude of said signal for automatically selecting one of said gain scales for operating on said signal and for generating a scale signal indicative of said selection, and means for periodically applying said gain signal to said modulator means.

3. The system according to claim 1 which includes means responsive to said differential temperature signal for generating an output signal corresponding to the square root of the squared time-averaged value of said temperature difference (RMS), said RMS signal being applied to said modulator means.

4. A system for continuously measuring differential temperature from the ground level through the tropopause comprising a gas-filled meteorological balloon and
   measuring and transmitting apparatus supported by said balloon during an ascending flight comprising two substantially identical probes having resistances which vary with the temperature and supported in closely spaced relationship to each other,
   a wheatstone bridge having four resistance arms in electrically balanced relation,
   two of said resistance arms comprising said probes,
   means for electrically energizing said bridge for producing a signal proportional to the difference in the resistances of said probes,
   a feedback circuit connected between the output of said bridge and the other two of said resistance arms whereby to maintain the bridge in a null balance state,
   means for applying said bridge output signal to a root mean square (RMS) circuit and deriving a RMS signal output corresponding to the square root of the square of the differential temperature of said probes,
   a radio frequency transmitter comprising an oscillator and a modulator adapted to turn said oscillator on and off at a variable repetition frequency to produce a train of pulses, and
   means for applying said RMS signal to said modulator whereby to vary the repetition frequency of said pulses in proportion to the values of said RMS signal.

* * * * *